United States Patent [19]
Ueno et al.

[11] Patent Number: 4,721,772
[45] Date of Patent: Jan. 26, 1988

[54] PROCESS FOR PRODUCING AROMATIC POLYAMIDE WITH POLAR SOLVENT CONTAINING SULFOLANE

[75] Inventors: Katsuji Ueno; Kenji Nagaoka, both of Hirakata; Akira Miyashita, Ibaraki, all of Japan

[73] Assignee: Sumitomo Chemical Company, Limited, Osaka, Japan

[21] Appl. No.: 508,146

[22] Filed: Jun. 27, 1983

[30] Foreign Application Priority Data

Jul. 6, 1982 [JP] Japan ............................... 57-118081

[51] Int. Cl.$^4$ .............................................. C08G 69/28
[52] U.S. Cl. .................................... 528/336; 528/183; 528/179; 528/222; 528/223; 528/225; 528/229; 528/313; 528/329.1; 528/331; 528/337; 528/348

[58] Field of Search ............... 528/336, 179, 183, 222, 528/223, 225, 229, 337, 348, 313, 331, 329.1

[56] References Cited

U.S. PATENT DOCUMENTS 3,870,685 3/1975 Jones et al. ..................... 528/336
4,045,417 8/1977 Yamazaki et al. ............... 528/336

Primary Examiner—Harold D. Anderson
Attorney, Agent, or Firm—Stevens, Davis, Miller & Mosher

[57] ABSTRACT

An aromatic polyamide having a high molecular weight is produced by a polycondensation reaction of an aromatic aminocarboxylic acid and/or a mixture of an aromatic dicarboxylic acid and an aromatic diamine in a polar solvent in the presence of a dehydrating catalyst with heating at a temperature of about 160° C. or higher.

16 Claims, No Drawings

PROCESS FOR PRODUCING AROMATIC POLYAMIDE WITH POLAR SOLVENT CONTAINING SULFOLANE

This invention relates to a process for producing an aromatic polyamide, more particularly to a process for producing an aromatic polyamide having a high molecular weight directly from inexpensive raw materials.

Aromatic polyamides generally have high heat resistance, mechanical strength and other excellent properties, and thus are used as remarkably useful raw materials for producing fibers, films, synthetic paper and the like.

Heretofore, as processes for producing these aromatic polyamides there are known a low-temperature solution polycondensation process in which an aromatic dicarboxylic acid dihalide and an aromatic diamine are reacted in a polar solvent in the presence or absence of an acid acceptor, an interfacial polycondensation process in which the same starting monomers as mentioned above are reacted in two-phase solvents, a process in which an aromatic dicarboxylic acid and an aromatic diisocyanate are reacted with heating, a process in which an aromatic dicarboxylic acid diaryl ester and an aromatic diamine are reacted with heating, and the like. But these processes are hardly said to be industrially sufficiently satisfactory processes, since there are used expensive active monomers which are also difficult to handle such as aromatic dicarboxylic acid dihalides, aromatic diisocyanates, or aromatic dicarboxylic acid diaryl esters. On the other hand, there is proposed a process for directly producing an aromatic polyamide from an aromatic aminocarboxylic acid or an aromatic dicarboxylic acid and an aromatic diamine by using as dehydrating agent a phosphorous acid ester and pyridine overcoming these disadvantages mentioned above (e.g. Published Examined Japanese patent application Nos. 7034/77, 7471/77, etc.). But such a process requires consumption of phosphorous acid ester and pyridine in amounts more than the stoichiometric amounts against the starting monomers and thus it is disadvantageous from an economical point of view.

The present inventors have extensively studied a process for directly producing an aromatic polyamide from an aromatic aminocarboxylic acid or an aromatic dicarboxylic acid and an aromatic diamine having no defects mentioned above due to the use of active monomers and found that when the monomers are reacted in the presence of a catalytic amount of dehydrating catalyst in a polar solvent at a special temperature or higher, an aromatic polyamide having a high molecular weight can be produced and accomplished the present invention.

This invention provides a process for producing an aromatic polyamide which comprises conducting a polycondensation reaction of an aromatic aminocarboxylic acid and/or a mixture of an aromatic dicarboxylic acid and an aromatic diamine in a polar solvent in the presence of a dehydrating catalyst with heating at a temperature of about 160° C. or higher.

The aromatic aminocarboxylic acid used in this invention includes a group of compounds represented by the formula:

$$H_2N-Ar_1-COOH \qquad (I)$$

wherein $Ar_1$ is a bivalent aromatic residue such as

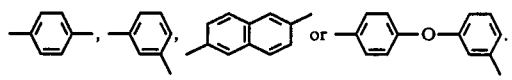

Examples of the aromatic aminocarboxylic acids of the formula (I) are p-aminobenzoic acid, m-aminobenzoic acid, 6-amino-2-naphthoic acid, etc. These aromatic aminocarboxylic acids can be used alone or as a mixture thereof.

The aromatic dicarboxylic acid used in this invention includes a group of compounds represented by the formula:

$$HOOC-Ar_2-COOH \qquad (II)$$

wherein $Ar_2$ is a bivalent aromatic residue. Examples of the bivalent aromatic residue of $Ar_2$ are

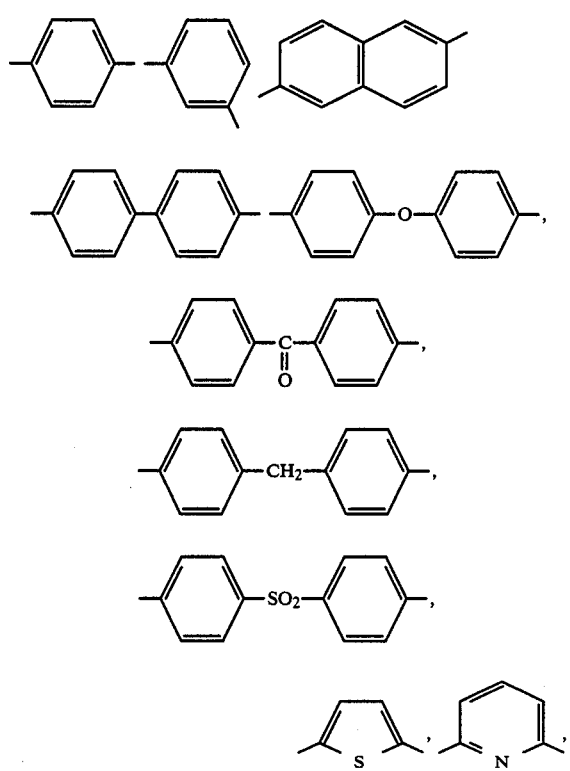

and the like.

Examples of the aromatic dicarboxylic acids of the formula (II) are terephthalic acid, isophthalic acid, naphthalenedicarboxylic acid, 4,4'-biphenyldicarboxylic acid, 4,4'-diphenyletherdicarboxylic acid, 4,4'-benzophenonedicarboxylic acid, 4,4'diphenylmethanedicarboxylic acid, 4,4'-diphenylsulfone dicarboxylic acid, 2-methylterephthalic acid, etc. These aromatic dicarboxylic acids can be used alone or as a mixture thereof.

A part of the above-mentioned aromatic dicarboxylic acid can be replaced by one or more aliphatic dicarboxylic acids such as adamantanedicarboxylic acid, cyclohexanedicarboxylic acid, etc., aliphatic or aromatic tricarboxylic acids or tricarboxylic acid anhydrides such as trimellitic acid anhydride, etc., aliphatic or aromatic tetracarboxylic acids or tetracarboxylic acid anhydrides such as pyromellitic acid anhydride, benzophenonetetracarboxylic acid, etc., so long as the smooth proceeding of the polycondensation reaction is not damaged or excellant properties of the aromatic polyamide are not damaged.

The aromatic diamine used in this invention includes a group of compounds represented by the formula:

$$H_2N-Ar_3-NH_2 \qquad (III)$$

wherein $Ar_3$ is a bivalent aromatic residue. Examples of the bivalent aromatic residue of $Ar_3$ are

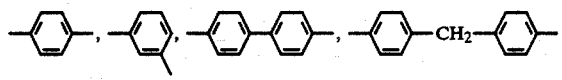

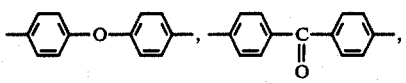

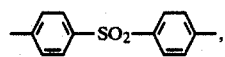

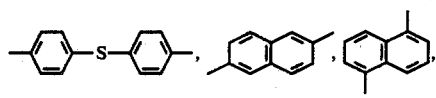

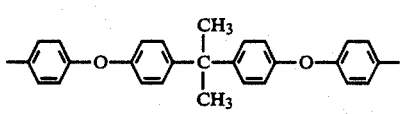

and the like.

Examples of the aromatic diamines of the formula (III) are p-phenylenediamine, m-phenylendediamine, toluylenediamine, 4,4'-diaminodiphenylmethane, 4,4'-diaminodiphenyl ether, 3,4'-diaminodiphenyl ether, 4,4'-diaminobiphenyl, 3,3'-dimethyl-4,4'-diaminobiphenyl, 4,4'-diaminodiphenylsulfide, 2,6-diaminonaphthalene, and the like. These aromatic diamines can be used alone or as a mixture thereof. A part of the above-mentioned aromatic diamine can be replaced by one or more aliphatic diamines such as cyclohexylenediamine, xylylenediamine, 2,2'-bis-(4-aminocyclohexyl)-propane, and the like so long as no disadvantages are caused.

The dehydrating catalyst used in this invention includes a group of catalysts used in dehydrating condensation reactions such as an amidation reaction, an esterification reaction, an etherification reaction and the like. Examples of such dehydrating catalysts are various phosphorus compounds, boron compounds, heteropoly-acids, and the like. Examples of phosphorus compounds are phosphorous acid esters such as trimethyl phosphite, triethyl phosphite, tributyl phosphite, triphenyl phosphite, tricresyl phosphite, tricyclohexyl phosphite, diethyl phosphite, diphenyl phosphite, o-methyl-S,S'-diphenyl dithiophosphite, etc.; phosphoric esters such as tributyl phosphate, triphenyl phosphate, ethyl phenyl phosphate, ethylene phenyl phosphate, etc.; phosphoric acids such as phosphoric acid, pyrophosphoric acid, metaphosphoric acid, tetrapolyphosphoric acid, trimetaphosphoric acid, ethylmetaphosphoric acid, etc.; phosphonic acids such as phenylphosphonic acid, etc.; phosphines such as triphenyl phosphine, trioctyl phosphine, etc.; phosphine oxides such as triphenyl phosphine oxide, 1-phenylphosphorin-3-oxide, etc.; phosphorus pentoxide, ammonium dihydrogen phosphate, p-diethyl trimethylsilyl phosphate, N,N',N''-hexamethylphosphorustriamide, tetrabutyl pyrophosphite, phenylphosphonous acid, tetrakis-(2,4-di-tertiary-butylphenyl)-4,4'-biphenylene diphosphite, distearyl pentaerythritol diphosphite, etc. Examples of boron compounds are boric acid, boric anhydride, etc. Examples of heteropoly-acids are 12-molybdphosphoric acid, 12-molybdsilicic acid, etc.

Among these dehydrating catalysts, preferable ones are phosphorous acid esters and boric acid and most preferable ones are triphenyl phosphite and boric acid.

The polar solvent used in this invention includes an aprotic organic polar solvent and a mixture of said aprotic organic polar solvent and other one or more solvents. Examples of the aprotic organic polar solvent are N-methyl-2-pyrrolidone, N-ethyl-2-pyrrolidone, N-ethylpiperidone, N-substituted lactams such as N-methyl-ε-caprolactam, N-substituted amides such as N,N-dimethylformamide, N,N-dimethylacetamide, etc., phosphoric acid amides such as hexamethylphosphoramide, sulfoxides such as dimethyl sulfoxide, sulfones such as sulfolane, etc. These aprotic polar solvents can be used alone or as a mixture thereof. Examples of other solvents which can be used as a mixture with the aprotic polar solvent are hydrocarbons such as benzene, toluene, xylene, ethylbenzene, heptane, naphtha, etc.; halogenated hydrocarbons such as o-dichlorobenzene, trichloroethylene, etc.; nitrated hydrocarbons such as nitrobenzene, nitrotoluene, etc.; nitriles such as benzonitrile, etc.; ketones such as acetophenone, γ-butyrolactone, etc.; ethers such as diphenyl ether, etc.; phenols such as phenol, cresol, etc. When a mixture of organic solvents is used, it is preferable to contain about 20% by weight or more of an aprotic organic polar solvent. Among these solvents, preferable polar solvents are sulfolane and a mixture of organic solvents containing about 20% by weight or more of sulfolane. Particularly preferable polar solvent is sulfolane.

The polar solvent mentioned above may contain about 5% by weight or less of water which is usually contained therein.

The reaction temperature of polycondensation reaction is about 160° C. or higher, preferably 200° C. or higher. When the reaction temperature is lower than 160° C., the polymerization rate practically usable cannot undesirably be obtained. The upper limit of the reaction temperature can be selected considering undesirable side reactions such as decomposition, gelation, and the like. Usually, the upper limit of the reaction temperature is 300° C., preferably 250° C.

In practicing the process of this invention, the aromatic aminocarboxylic acid and/or a mixture of the aromatic dicarboxylic acid and the aromatic diamine are reacted in the presence of the above-mentioned dehydrating catalyst in the above-mentioned polar solvent with heating at the above-mentioned temperature. The aromatic dicarboxylic acid and the aromatic diamine can be used in almost equimolar amounts. When both the aromatic aminocarboxylic acid and the aromatic dicarboxylic acid are used, these acids can be used in any proportions.

The dehydrating catalyst can be added to the reaction system at one time with whole amount at the beginning of the reaction or can be added to the reaction system separately or intermittently or continuously in the course of the reaction. The amount of the dehydrating catalyst used is about 0.001 mole or more per mole of a total of the aromatic diamine used and the aromatic aminocarboxylic acid used. There is no particular upper limit of the catalyst amount since no particular disadvantage is caused. But considering economy, a recommended range is 0.001 to 0.2 mole per mole of the total of the aromatic diamine used and the aromatic aminocarboxylic acid used. When the amount of the dehydrating catalyst is less than 0.001 mole, there cannot undesirably be obtained an aromatic polyamide having a sufficiently high molecular weight.

The polar solvent may be present in the reaction system in whole amount from the beginning of the reaction or a part of the polar solvent may be added to the reaction system in the course of the reaction. In the latter case, the solvent to be added in the course of the reaction may be the same as or different from that present in the reaction system.

There is no particular limit as to the amount of the polar solvent to the starting monomers, but the polar solvent is usually selected so as to make the concentration of aromatic polyamide produced 4 to 60% by weight. A preferable range of the concentration of the aromatic polyamide produced is 6 to 40% by weight. In the process of this invention, it is not necessary to employ a procedure in which a particularly high initial concentration is gradually diluted in the course of the reaction in order to obtain an aromatic polyamide having a high molecular weight. But it is effective to relatively enhance the initial concentration in order to obtain a higher polymerization rate.

With the progress of the polycondensation reaction, water is produced. In order to obtain the aromatic polyamide having a high molecular weight and in order to obtain higher polymerization rate, it is necessary to remove the water produced out of the reaction system. In order to remove the water out of the system, there can be employed a process in which the reaction is carried out with heating while an inert gas is passed through the system, a process in which the reaction is carried out with heating while distilling a part of the reaction solvent, and the like.

The reaction time required for producing an aromatic polyamide having a high molecular weight varies depending on the conditions employed but usually is 2 to 20 hours.

In practicing the process of this invention, there is no limit to adding a molecular weight modifier to the reaction system. Examples of the molecular weight modifier are monofunctional compounds, e.g., monocarboxylic acids such as benzoic acid, etc., monoamines such as aniline, etc.

The polycondensation reaction proceeds in the state of uniform solution or in the state of slurry wherein the aromatic polyamide produced is deposited depending on the kinds of monomers selected. After a predetermined time of the reaction, there can be obtained a solution or slurry of aromatic polyamide. The resulting solution or slurry can directly be used for molding or be supplied to a process for separating solid aromatic polyamide such as non-solvent precipitation, and the like. When the non-solvent precipitation process is employed, there can be used such non-solvents as acetone, methanol, water and the like. The solid aromatic polyamide thus obtained is, if necessary, washed with acetone, methanol, water or the like, subjected to a treatment such as steam stripping, or the like followed by a conventional drying such as vacuum drying, fluidized-bed drying to give a final product of aromatic polyamide in the form of powder or granule.

According to the process of this invention, since there are used as starting materials an aromatic aminocarboxylic acid and/or a mixture of an aromatic dicarboxylic acid and an aromatic diamine which are inexpensive and easy to handle and the process employed is simple, there can be obtained an aromatic polyamide having a high molecular weight extremely economically. Since the thus produced aromatic polyamide has excellent properties due to the high molecular weight, it can be used as heat resistant film, fibers, or can be processed to molded articles by compression, extrusion or injection. As mentioned above, the aromatic polyamide thus produced can be used widely and effectively, so that the present invention has a great industrial value.

This invention is illustrated by way of the following Examples but not limited thereto.

In the following Examples, reduced viscosity ($\eta sp/C$) is measured in N-methyl-2-pyrrolidone at a concentration of 0.5 g/100 ml and 25° C.

EXAMPLE 1

In a 500-ml separable flask equipped with a thermometer, a nitrogen introducing pipe, a distllation column, and a stirrer, 16.6 g (0.1 mole) of isophthalic acid, 20.0 g (0.1 mole) of 3,4'-diaminodiphenyl ether, 0.62 g (0.002 mole) of triphenyl phosphite and 60 ml of sulfolane were placed and heated to 220° C. (inner temperature) in about 1 hour with stirring under a nitrogen gas stream. When the inner temperature reached about 150° C., distillation of water began. When the inner temperature reached 220° C., about 90% of water based on the theoretical value was distilled off.

Stirring was continued at 220° C. and the system became remarkably viscous at about 1.5 hours after the beginning of the polymerization procedure. Then, 50 ml of sulfolane was added to the system so as to make the stirring smooth. The reaction was continued at 220° C. and 50 ml of sulfolane was further added at 3 hours from the beginning for the same purpose. After additional 2 hours' reaction at 220° C., heating was stopped to give a viscous polymer solution. After cooling, the solution was poured into 2 liter of deionized water vigorously stirred by a mixer to deposit solid polymer. The solid polymer was filtered, ground in a mortar, washed with water 2 times and dried under reduced pressure at 160° C. for 24 hours. As a result, there was obtained 31.5 g (yield 95.6%) of beige powdered polymer. The resulting polymer was identified as aromatic polyamide by infrared absorption spectrum.

Reduced viscosity of the aromatic polyamide thus obtained was as high as 0.804 dl/g. Further, a press sheet having a thickness of 1 mm obtained by compression molding in a nitrogen atmosphere at 320° C. with 300 kg/cmhu 2 for 5 minutes was very tough.

COMPARATIVE EXAMPLE 1

The process of Example 1 was repeated except for changing the polymerization temperature to 120° C. Even after 48 hours' polymerization procedure, no increase in viscosity of the reaction system was admitted.

EXAMPLES 2 to 4

The process of Example 1 was repeated except for using aromatic dicarboxylic acids and aromatic diamines as shown in Table 1.

The results are as shown in Table 1.

TABLE 1

| Example No. | Aromatic dicarboxylic acid | Aromatic diamine | State of reaction mixture | Yield (%) | η sp/C (dl/g) |
|---|---|---|---|---|---|
| 2 | Isophthalic acid (0.07) + terephthalic acid (0.03) | 4,4'-Diaminodiphenyl ether (0.1) | Viscous slurry | 97.3 | 0.403 |
| 3 | Terephthalic acid (0.1) | 3,4'-Diaminodiphenyl ether (0.1) | Viscous slurry | 96.5 | 0.458 |
| 4 | Isophthalic acid (0.1) | 3,4'-Diaminodiphenyl ether (0.07) + m-phenylenediamine (0.03) | Viscous slurry | 95.8 | 0.774 |

(Note)
Figures in ( ) in the columns of the aromatic dicarboxylic acid and the aromatic diamine mean molar numbers charged.
The mark "+" means that two kinds of monomers are used as a mixture thereof.

EXAMPLES 5 to 8

The process of Example 1 was repeated except for using a mixture of 0.07 mole of isophthalic acid and 0.03 mole of terephthalic acid in place of 0.1 mole of isophthalic acid and 0.002 mole of a dehydrating catalyst as listed in Table 2 in place of 0.002 mole of triphenyl phosphite. There was obtained a viscous polymere solution in each case. The resulting solution was after-treated in the same manner as described in Example 1. The results are as shown in Table 2.

TABLE 2

| Example No. | Dehydrating catalyst | Yield (%) | η sp/C (dl/g) |
|---|---|---|---|
| 5 | Phosphoric acid | 95.8 | 0.641 |
| 6 | Triethyl phosphate | 95.1 | 0.584 |
| 7 | Trioctyl phosphate | 95.6 | 0.602 |
| 8 | Boric acid | 96.2 | 0.744 |

EXAMPLES 9 to 12

The process of Example 1 was repeated except for changing the polymerization temperature to 200° C. and using a polar solvent as listed in Table 3 in place of sulfolane. The same after-treatment as described in Example 1 was employed.

The results are as shown in Table 3.

TABLE 3

| Example No. | Polar solvent | Yield (%) | η sp/C (dl/g) |
|---|---|---|---|
| 9 | Sulfolane (70) + N-methyl-2-pyrrolidone (30) | 95.6 | 0.625 |
| 10 | Sulfolane (70) + xylene (30) | 96.1 | 0.551 |
| 11 | Sulfolane (50) + m-cresol (50) | 94.3 | 0.523 |
| 12 | Sulfolane (70) + nitrobenzene (30) | 95.6 | 0.650 |

(Note)
Figures in ( ) in the column of the polar solvent means percents by weight.

EXAMPLE 13

The process of Example 1 was repeated except for using as monomers a mixture of 0.01 moles of m-aminobenzoic acid, 0.09 mole of isophthalic acid and 0.09 mole of 3,4'-diaminodiphenyl ether.

As a result, there was obtained an aromatic polyamide in yield of 95.8% and having a reduced viscosity of 0.614 dl/g.

What is claimed is:

1. A process for producing a high molecular weight aromatic polyamide comprising heating and polycondensing reactants selected from the group consisting of (a) an aromatic aminocarboxylic acid, (b) a mixture of an aromatic dicarboxylic acid and an aromatic diamine and (c) a mixture of (a) and (b) in a polar solvent in contact with a dehydrating catalyst at a reaction temperature of about 160° C. or higher, said polar solvent being at least one organic solvent and containing about 20% by weight or more of sulfolane.

2. A process according to claim 1, wherein the aromatic aminocarboxylic acid is at least one compound of the formula:

$$H_2N-Ar_1-COOH$$

wherein $Ar_1$ is a bivalent aromatic residue.

3. A process according to claim 2, wherein the aromatic aminocarboxylic acid is p-aminobenzoic acid or m-aminobenzoic acid.

4. A process according to claim 1, wherein the aromatic dicarboxylic acid is at least one compound of the formula:

$$HOOC-Ar_2-COOH$$

wherein $Ar_2$ is a bivalent aromatic residue.

5. A process according to claim 4, wherein the aromatic dicarboxylic acid is at least one member selected from the group consisting of terephthalic acid, isophthalic acid, naphthalenedicarboxylic acid, 4,4'-biphenyldicarboxylic acid, 4,4'-diphenyl ether dicarboxylic acid, 4,4'-benzophenonedicarboxylic acid, 4,4'-diphenylmethanedicarboxylic acid, 4,4'-diphenylsulfone dicarboxylic acid, and 2-methylterephthalic acid.

6. A process according to claim 1 wherein the aromatic diamine is at least one compound of the formula:

$$H_2N-Ar_3-NH_2$$

wherein $Ar_3$ is a bivalent aromatic residue.

7. A process according to claim 6, wherein the aromatic diamine is at least one member selected from the group consisting of p-phenylenediamine, m-phenylenediamine, toluylenediamine, 4,4'-diaminodiphenylmethane, 4,4'-diaminodiphenyl ether, 3,4'-diaminodiphenyl ether, 4,4'-diaminobiphenyl, 3,3'-dimethyl-4,4'-diaminobiphenyl, 4,4'-diaminodiphenylsulfide, and 2,6-diaminonaphthalene.

8. A process according to claim 1, wherein the dehydrating catalyst is a phosphorus compound, a boron compound or a heteropoly-acid.

9. A process according to claim 1, wherein the polar solvent is sulfolane.

10. A process according to claim 1, wherein the reaction temperature is 200° to 250° C.

11. A process according to claim 1, wherein the dehydrating catalyst is a phosphorus compound.

12. A process according to claim 1, wherein the dehydrating catalyst is a phosphorous acid ester.

13. A process according to claim 1, wherein the dehydrating catalyst is boric acid.

14. A process according to claim 1 wherein there is polycondensed a mixture of isophthalic acid and 3,4'-diaminodiphenyl ether.

15. A process according to claim 1, wherein the aromatic dicarboxylic acid is a mixture of terephthalic acid and isophthalic acid and the aromatic diamine comprises mainly 3,4,'-diaminodiphenyl ether.

16. A process according to claim 1 wherein the dehydating catalyst amount is from 0.001 to 0.02 mole per total mole of amino carboxylic acid an diamine.

* * * * *